United States Patent
Moriai et al.

(10) Patent No.: US 7,187,769 B1
(45) Date of Patent: Mar. 6, 2007

(54) METHOD AND APPARATUS FOR EVALUATING THE STRENGTH OF AN ENCRYPTION

(75) Inventors: Shiho Moriai, Yokohama (JP); Kazumaro Aoki, Yokohama (JP); Masayuki Kanda, Yokohama (JP); Youichi Takashima, Yokohama (JP); Kazuo Ohta, Zushi (JP)

(73) Assignee: Nippon Telegraph and Telephone Public Corporation (JP)

( * ) Notice: Subject to any disclaimer, the term of this patent is extended or adjusted under 35 U.S.C. 154(b) by 0 days.

(21) Appl. No.: 09/463,907

(22) PCT Filed: Jun. 1, 1999

(86) PCT No.: PCT/JP99/02924

§ 371 (c)(1),
(2), (4) Date: Feb. 2, 2000

(87) PCT Pub. No.: WO99/63706

PCT Pub. Date: Dec. 9, 1999

(30) Foreign Application Priority Data

Jun. 2, 1998 (JP) .................................. 10-153066

(51) Int. Cl.
*H04K 3/00* (2006.01)
(52) U.S. Cl. ........................................................ 380/1
(58) Field of Classification Search .................. 380/28, 380/29, 37, 1
See application file for complete search history.

(56) References Cited

U.S. PATENT DOCUMENTS

| | | | | |
|---|---|---|---|---|
| 5,511,123 A | * | 4/1996 | Adams | 380/29 |
| 5,623,548 A | * | 4/1997 | Akiyama et al. | 380/28 |
| 5,745,577 A | * | 4/1998 | Leech | 380/28 |
| 5,796,837 A | * | 8/1998 | Kim et al. | 380/28 |
| 5,825,886 A | * | 10/1998 | Adams et al. | 380/28 |
| 6,031,911 A | * | 2/2000 | Adams et al. | 380/29 |
| 6,035,042 A | * | 3/2000 | Mittenthal | 380/37 |

(Continued)

FOREIGN PATENT DOCUMENTS

JP    11-212452    * 1/1998

OTHER PUBLICATIONS

Lars R. Kundsen. Block Cipher—Analysis, Design and Application. Jul. 1, 1994. p. 53-143.*

(Continued)

*Primary Examiner*—Christopher Revak
*Assistant Examiner*—Christian LaForgia
(74) *Attorney, Agent, or Firm*—Connolly Bove Lodge & Hutz, LLP; Larry J. Hume (57) ABSTRACT

In the evaluation of the randomness of an S-box, measures of resistance to higher order cryptanalysis, interpolation cryptanalysis, partitioning cryptanalysis and differential-linear cryptanalysis and necessary conditions for those measures to have resistance to each cryptanalysis are set, then for functions as candidates for the S-box, it is evaluated whether one or all of the conditions are satisfied, and those of the candidate functions for which one or all of the conditions are satisfied are selected as required. It is also possible to further evaluate the resistance of such selected functions to at least one of differential cryptanalysis and linear cryptanalysis and select those of the candidate functions which are resistant to at least one of the cryptanalyses as required.

15 Claims, 2 Drawing Sheets

U.S. PATENT DOCUMENTS 6,314,186 B1 * 11/2001 Lee et al. .................... 380/28
6,504,929 B1 * 1/2003 Tsunoo ....................... 380/28
6,751,319 B2 * 6/2004 Luyster ....................... 380/37

OTHER PUBLICATIONS

Lars R. Kundsen. Block Cipher—A Survey. 1997. p. 18-45.*
Francois-Xazier Standaert et al. Cyrptanalysis of Block Ciphers: A Survey. 2003. Universite catholique de Louvain.*
Yasuyoshi Kaneko et al. On Provable Security against Differential and Linear Cryptanalysis in Generalized Feistel Ciphers with Multiple Random Functions. 1997. p. 185-199.*
Thomas Jakobsen et al. the Interpolation Attack on Block Ciphers.*
Yulian Zheng et al. On the Construction of Block Ciphers Provably Secure and Not Relying on Any Unproved Hypothesis. 1998. Springer-Verlag.*
Lars R. Knudsen. Block Cipher—Analysis, Design and Application. Jul. 1, 1994. p. 53-143.*
Thomas Jakobsen et al. The Interpolation Attack on Block Ciphers. 1996.*
Carlo Harpes. Partitioning Cryptanalysis. Mar. 23, 1995. p. 1-30.*
Susan K. Langford et al. Differential-Linear Cryptanalysis. 1994. Springer-Verlag Berlin Heidelberg. p. 17-25.*
Xuejia Lai et al. Markov Ciphers and Differential Cryptanalysis. 1998. Springer-Verlag. p. 17-38.*
Vincent Rijmen et al. The Cipher Shark. Fast Software Encryption, LNCS 1039. 1996. p. 99-111.*

Bruce Schneier. Applied Cryptography. 1996. John Wiley & Sons, Inc. $2^{nd}$ Edition. p. 349-351.*
Kaisa Nyberg. Differentially Uniform Mappings for Cryptography. Advances in Cryptology—Eurocrypt '93 Proceedings, Springer-Verlag. 1994. pp. 55-64.*
Shiho Moriai, "How to Design Secure S-boxes against Differential, Linear, Higher Order Differential, and Interpolation Attacks," Telecommunications Advancement Organization of Japan, SCIS '98, 2.2C, Jan. 1998, pp. 1-8.
Hamade, Takeshi, et al., "On Partitioning Cryptanalysis of DES," Telecommunications Advancement Organization of Japan, SCIS '98, 2.2A, Jan. 1998, pp. 1-8.
Langford, S.K., and Hellman, M.E., "Differential-Linear Cryptanalysis," *Lecture Notes in Computer Science*, Advances in Cryptology CRYPTO '94, vol. 839, 1994, pp. 17-25.
Sakurai, Kouichi, "Angou riron no kiso," Kyoritsu Shuppan, pp. 69-72, 1996.
Kanda, Masayuki, et al., "A Round Function Structure Consisting of Few S-boxes (Part II)," Telecommunications Advancement Organization of Japan, SCIS '98, 2.2.D. Jan. 1998, pp. 1-8.
Moriai, Shiho, et al., "S-box Design Considering the Security Against Known Attacks on Block Ciphers," *Technical Report of the IEICE*, ISEC98-13, vol. 98, No. 227, Jul. 30, 1998, pp. 25-32.

* cited by examiner

METHOD AND APPARATUS FOR EVALUATING THE STRENGTH OF AN ENCRYPTION

TECHNICAL FIELD

The present invention relates to an apparatus and method which are applied, for example, to a cryptographic device to evaluate whether candidate functions satisfy several randomness criteria so as to obtain functions that generate randomly an output from the input and hence make the analysis of its operation difficult; the invention also pertains to an apparatus and method for generating random functions evaluated to satisfy the randomness criteria, and a recording medium having recorded thereon programs for implementing these methods.

PRIOR ART

Cryptographic techniques are effective in concealing data. Cryptographic schemes fall into a secret-key cryptosystem and a public-key cryptosystem. In general, the public-key cryptosystem is more advanced in the research of security proving techniques than secret-key cryptosystem, and hence it can be used with the limit of security in mind. On the other hand, since security proving techniques have not been established completely for the secret-key cryptosystem, it is necessary to individually deal with cryptanalytic methods when they are found.

To construct fast and secure secret-key cryptography, there has been proposed a block cipher scheme that divides data into blocks of a suitable length and enciphers each block. Usually, the block cipher is made secure by applying a cryptographically not so strong function to the plaintext a plurality of times. The cryptographically not so strong function is called an F-function.

It is customary in the art to use, as an element of the F-function, a random function, called an S-box, which generates randomly an output from the input thereto, making it difficult to analyze its operation. With the S-box that has the random function capability of providing a unique input/output relationship, it is possible to achieve constant and fast output generation irrespective of the complexity of the random function operation itself, by implementing the S-box in a ROM where the output data associated with the input data are memorized as a table. Since the S-box was adopted typically in DES (Data Encryption Standard), its security and design strategy have been studied. Conventionally, the security criterion assumed in the design of the S-box is only such that each bit of encrypted data, for instance, would be a 0 or 1 with a statistical probability of 50 percent—this is insufficient as the theoretical criterion for the security of block ciphers.

In actual fact, cryptanalysis methods for block ciphers that meet the above-mentioned criterion have been proposed: a differential cryptanalysis in literature "E. Biham, A. Shamir, 'Differential Cryptanalysis of DES-like cryptosystems,' Journal of Cryptology, Vol. 4, No. 1, pp. 3–72" and a linear cryptanalysis in literature "M. Matsui, 'Linear Cryptanalysis Method for DES Ciphers,' Advances in Cryptology-EUROCRYPT' 93 (Lecture Notes in Computer Science 765), pp. 386–397, Springer-Verlag, 1994." It has been found that many block ciphers can be cryptanalyzed by these methods; hence, it is now necessary to review the criteria for security.

After the proposal of the differential and linear cryptanalysis methods the block ciphers have been required to be secure against them. To meet the requirement, there have been proposed, as measures indicating the security against the cryptanalysis methods, a maximum average differential probability and a maximum average linear probability in literature "M. Matsui, 'New Structure of Block Ciphers with Provable Security against Differential and Linear Cryptanalysis,' D. Gollmann, editor, Fast Software Encryption, Third International Workshop, Cambridge, UK, February 1996, Proceedings, Vol. 1039 of Lecture Notes in Computer Science, pp. 205–218, Springer-Verlag, Berlin, Heidelberg, New York, 1996." It is indicated that the smaller the measures, the higher the security against the respective cryptanalysis.

Moreover, it has recently been pointed out that even ciphers secure against the differential and the linear cryptanalysis are cryptanalyzed by other cryptanalysis methods, and consequently, the criterion for security needs a further reappraisal. More specifically, in literature "T. Jackson, L. R. Knudsen, 'The Interpolation Attack on Block Ciphers,' Fast Software Encryption Workshop (FSE4) (Lecture Notes in Computer Science 1276), pp. 28–40, Springer-Verlag, 1997," it is described that some ciphers, even if secure against the differential and the linear cryptanalysis, are cryptanalyzed by a higher order differential attack or interpolation attack.

Other than the higher order differential attack and interpolation attack, a partitioning cryptanalysis generalized from the linear cryptanalysis is introduced in literature "C. Harpes, J. L. Massey, 'Partitioning Cryptanalysis,' Fast Software Encryption Workshop (FSE4) (Lecture Notes in Computer Science 1267), pp. 13–27, Springer-Verlag, 1997," and hence it is necessary to provide ciphers with sufficient security against this cryptanalysis.

The technology to ensure the security against the differential and the linear cryptanalysis has been established for the construction of some block ciphers, while as of this point in time no technology has been established yet which guarantees perfect security against the higher order differential attack, the interpolation attack and the partitioning attack. In other words, there have not been clarified necessary and sufficient conditions that random functions, i.e. the so-called S-boxes, need to satisfy so as to make ciphers invulnerable to these attacks.

In designing the S-boxes it is an important issue to provide sufficient security against these attacks. In attacks on block ciphers often the S-boxes utilize any imbalances in their input/output relationships of S-boxes. Accordingly, to design an S-box resistant to an attack is to design an S-box that has little unbalanced, that is, random input/output relationship. Hence, to evaluate the resistance of the S-box to an attack is equivalent to the evaluation of its randomness.

It is therefore an object of the present invention to find out a criterion closely related to the level of security against each of the above-mentioned attacks, to show the criterion representing a necessary condition to be met for providing the resistance to the attack (not a necessary and sufficient condition for guaranteeing the security against the attack), and to provide a function randomness evaluating apparatus and method which evaluate the randomness of the function concerned according to the criterion, and a recording medium having recorded thereon the method as a program. Another object of the present invention is to provide an apparatus and method for generating random functions that satisfy the security criteria, and a recording medium having recorded thereon the method as a program.

DISCLOSURE OF THE INVENTION

The function randomness evaluating apparatus and method according to the present invention execute at least one of the processes of:

calculating the minimum value of the degree of a Boolean polynomial regarding the input by which each output bit of the function to be evaluated is expressed, and evaluating the resistance of the function to higher order differential cryptanalysis accordingly;

when fixing a key y and letting x denote the input, expressing an output y by $y=f_k(x)$ using a polynomial over the Galois field which is composed of elements equal to a prime p or a power of the prime p, then calculating the number of terms of the polynomial, and evaluating the resistance of the function to interpolation cryptanalysis accordingly;

dividing all inputs of the function to be evaluated and the corresponding outputs into input subsets and output subsets, then calculating an imbalance of the relationship between the subset of an input and the subset of the corresponding output with respect to their average corresponding relationship, and evaluating the resistance of the function to partitioning cryptanalysis accordingly; and calculating, for every set of input difference $\Delta x$ and output mask value $\Gamma y$ of the function S(x) to be evaluated, the number of inputs x for which the inner product of $(S(x)+S(x+\Delta x))$ and the output mask value $\Gamma y$ is 1, and evaluating the resistance of the function to differential-linear cryptanalysis accordingly.

The random function generating apparatus and method according to the present invention generate candidate functions each formed by a plurality of functions of different algebraic structures and having a plurality of parameters, evaluates the resistance of each candidate function to cryptanalysis, and select candidate functions of higher resistance to the cryptanalysis.

BEST MODE FOF CARRYING OUT THE INVENTION

Embodiment According to a First Aspect of the Present Invention

Figure 1:
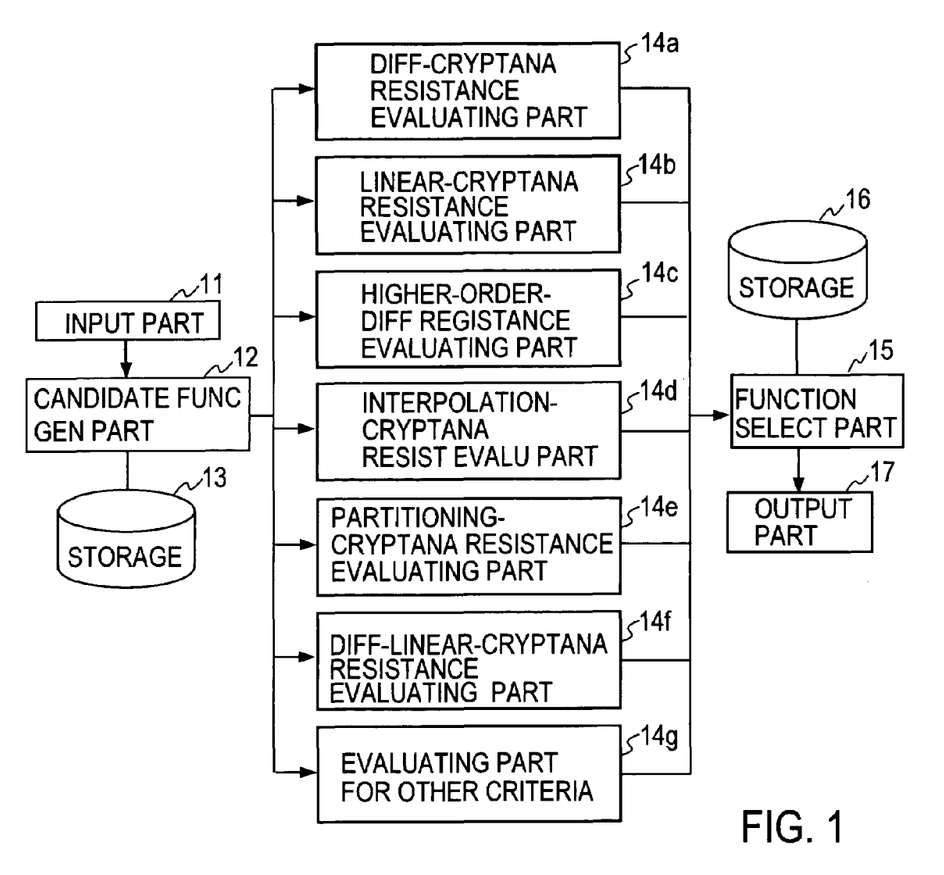
FIG. 1 is a block diagram illustrating an example of the functional configuration of each of the random function generating apparatus and the function randomness evaluating apparatus according to the present invention.

In FIG. 1 there is depicted the functional configuration of an embodiment of each of the random function generating apparatus and the function randomness evaluating apparatus according to the present invention. An input part 11 inputs therethrough data and a parameter that are needed to generate a candidate function in a candidate function generating part 12. The candidate function generating part 2 generates a candidate function based on the input provided through the input part 11, and provides its parameter value, the input value and the calculation result (an output value) to a storage part 13. Various pieces of data thus stored in the storage part 13 are read out therefrom and fed to a differential-cryptanalysis resistance evaluating part 14a, a linear-cryptanalysis resistance evaluating part 14b, a higher-order-differential-attack resistance evaluating part 14c, an interpolation-attack resistance evaluating part 14d, a partitioning-attack resistance evaluating part 14e, a differential-linear-attack resistance evaluating part 14f, and a criteria evaluating part 14g for evaluating other criteria. Based on the results of evaluations made in the respective evaluating parts, candidate functions of high resistance to the attacks are selected in a function select part 15 and stored in a storage part 16, from which a required one of the candidate functions is read out and provided to the outside via an output part 17.

In the function randomness evaluating apparatus according to the present invention, the functions to be evaluated are provided via the input part 11 to the respective evaluating parts 14a to 14g for the evaluation of their randomness.

A description will be given below of security criteria for the differential cryptanalysis, the linear cryptanalysis, the higher order differential attack, the interpolation attack, the partitioning attack and the differential-linear attack and of necessary conditions for the security criteria to have resistance to the respective attacks. In the following description, let n and m be arbitrary natural numbers and consider, as the S-box (a random-function), a function S of an n-bit input and an m-bit output: $GF(2)^n \rightarrow GF(2)^m$. $GF(2)^n$ represents a set of all n-bit data.

(a) Necessary Condition for Resistance to Differential Cryptanalysis

A description will be given below of a criterion for differential cryptanalysis is defined as a measure of the resistance thereto of the S-box, a method for measuring the criterion and a necessary condition for the resistance to differential cryptanalysis. In the differential cryptanalysis method, an observation is made of the difference between outputs (an output difference value) of the S-box corresponding to the difference between its two inputs (an input difference value), and if a large imbalance is found between them, it can be used to cryptanalyze the whole cipher.

Letting the input value to the S-box be represented by x, the difference value between the two inputs by $\Delta x$, the difference value of the two outputs corresponding to the two inputs by $\Delta y$, the function of the S-box by S and the output y from the S-box for the input thereto by $y=S(x)$, let $\delta_s(\Delta x, \Delta y)$ be the number of those values x of all n-bit input values x which satisfy the following equation (1) for an arbitrary input difference value $\Delta x$ and an arbitrary output difference value $\Delta y$.

$$S(x)+S(x+\Delta x)=\Delta y \tag{1}$$

where "+" is usually defined by the exclusive OR (XOR) for each bit. As described in literature "X. Lai, J. M. Massey, and S. Murphy, 'Markov Ciphers and Differential Cryptanalysis,' In D. W. Davies, editor, Advances in Cryptology-EUROCRYPT '91, Volume 547 of Lecture Notes in Computer Science, pp. 17–38, Springer-Verlag, Berlin, Heidelberg, New York, 1991," the difference operation can be substituted with an arbitrary binary operation that provides a general inverse; the differential cryptanalysis method mentioned herein includes them. The differential cryptanalysis utilizes an imbalance in the relationship between the operation results on two arbitrary inputs and the two outputs corresponding thereto.

The number $\delta_S(\Delta x, \Delta y)$ of inputs x that satisfy Eq. (1) for a given pair of $\Delta x$ and $\Delta y$ is expressed by the following equation (2):

$$\delta_S(\Delta x, \Delta y) = \#\{x \in GF(2)^n | S(x) + S(x + \Delta x) = \Delta y\} \quad (2)$$

where #{x| conditional equation} represents the number of inputs x that satisfy the conditional equation. The number $\delta_S(\Delta x, \Delta y)$ of inputs x can be calculated from Eq. (2) for all pieces of n-bit data $\Delta x$ as the input difference value, except 0, and all pieces of m-bit data $\Delta y$ as the output difference value. A combination of $\Delta x$ and $\Delta y$ that maximizes the above-said number constitutes a vulnerability to the differential cryptanalysis—this means that the smaller the maximum value of $\delta_S(\Delta x, \Delta y)$, the higher the resistance to differential cryptanalysis. Therefore, it is the necessary condition for the resistance to differential cryptanalysis that the criterion for differential cryptanalysis, $\Delta_S$, given by the following equation (3) is small.

$$\Delta_S = \max \delta_S(\Delta x, \Delta y) \quad (3)$$

Eq. (3) indicates selecting that one of all the combinations of $\Delta x \neq 0$ and $\Delta y$ which provides the maximum value of $\delta_S$ and using it as the value of $\Delta_S$.

(b) Necessary Condition for Resistance to Linear Cryptanalysis

A description will be given below of the definition of a criterion for linear cryptanalysis as a measure of the resistance thereto of the S-box, a method for measuring the criterion and a necessary condition for the resistance to linear cryptanalysis.

In the linear cryptanalysis method, an observation is made of an arbitrary exclusive OR between the input and output values of the S-box, and if a large imbalance is found between them, it can be used to cryptanalyze the whole cipher.

Letting the input to the S-box be represented by x, an input mask value by $\Gamma x$ and an output mask value by $\Gamma y$, $\lambda_S(\Delta x, \Delta y)$ defined by the following equation (4) can be calculated for a certain input mask value $\Gamma x$ and a certain output mask value $\Gamma y$.

$$\lambda_S(\Gamma x, \Gamma y) = |2 \times \#\{x \in (2)^n | x \cdot \Gamma x = S(x) \cdot \Gamma y\} - 2^2| \quad (4)$$

where "·" is usually defined by the inner product. $x \cdot \Gamma x$ means summing-up of only those bit values in the input x which correspond to "1s" in the mask value $\Gamma x$, ignoring the bit values corresponding to "0s". That is, $x \cdot \epsilon x = \epsilon x_i$ (where $\epsilon$ is the sum total of i-th bits in $\Gamma x$ which are "1s"), where $x = (x_{n-}, \ldots, x_0)$. The same is true of $y \cdot \Gamma y$. Accordingly, Eq. (4) expresses the absolute value of a value obtained by subtracting $2^n$ from the double of the number of those of all ($2^n$) n-bit inputs x which satisfy $x \cdot \Gamma x = S(x) \cdot \Gamma y$ for given sets of mask values ($\Gamma x$, $\Gamma y$).

From Eq. (4) $\lambda_S(\Gamma x, \Gamma y)$ can be calculated for all sets of n-bit data $\Gamma x$ as the input mask value and m-bit data $\Gamma y$ as the output mask value, except 0. A combination of $\Gamma x$ and $\Gamma y$ that maximizes $\lambda_S(\Gamma x, \Gamma y)$ constitutes a vulnerability to the linear cryptanalysis—this means that the smaller the maximum value of $\lambda_S(\Gamma x, \Gamma y)$, the higher the resistance to linear cryptanalysis. Therefore, it is the necessary condition for the resistance to linear cryptanalysis that the criterion for linear cryptanalysis, $\Lambda_S$, given by the following equation (5) is small.

$$\Lambda_S = \max \lambda_S(\Gamma x, \Gamma y) \quad (5)$$

Eq. (5) indicates selecting that one of all the combinations of $\Gamma x$ and $\Gamma y \neq 0$ which provides the maximum value of $\lambda_S(\Gamma x, \Gamma y)$ and setting as the value of $\Lambda_S$.

(c) Necessary Condition for Resistance to Higher Order Differential Attack

A description will be given below of the definition of a criterion for higher order differential attack as a measure of the resistance thereto of the S-box, a method for measuring the criterion and a necessary condition for the resistance to higher order differential attack.

The higher order differential attack utilizes the fact that the computation of a higher order differential the intermediate output in the course of encryption with respect to the input provides a key-independent constant. An arbitrary bit of arbitrary intermediate data during encryption can be expressed by a Boolean polynomial regarding the input. For instance, a bit $y_j$ of certain intermediate data can be expressed by a Boolean polynomial regarding an N-bit input x as follows:

$$y_j = x_0 + x_1 x_3 + x_0 x_2 x_3 + \ldots + x_1 x_4 x_5 x_6 \ldots x_N \quad (6)$$

When the degree of the Boolean polynomial is d, the calculation of the (d+1)-th order differential (for instance, XOR of $2^{d+1}$ outputs) results in providing a key-independent constant; attacks on ciphers of low-degree Boolean polynomials are reported in the afore-mentioned literature "The Interpolation Attack on Block Ciphers" by T. Jackson and L. R. Knudsen.

With a low-degree Boolean polynomial representation of an F-function, an insufficient number of iterations of the F-function will not raise the degree of the Boolean representation of the whole cipher, increasing the risk of the cipher being cryptanalyzed. Hence, a necessary condition for making the cipher secure against higher order differential attack without increasing the number of iterations of the F-function is that the degree of the Boolean polynomial representation of the S-box as a component of the F-function is also high.

For

S-box $S: GF(2)^n \rightarrow GF(2)^m; x \mapsto S(x)$, set $$y = S(x), \quad (7a)$$

$$x = (x_{n-1}, x_{n-2}, \ldots, x_0) \in GF(2)^n, \quad (7b)$$

$$y = (y_{m-1}, y_{m-2}, \ldots, y_0) \in GF(2)^m \quad (7c)$$

And a set of variables $X = \{x_{n-1}, x_{n-2}, \ldots, x_0\}$ is defined. At this time, a Boolean function $y_i = S_i(x)$ is defined as follows:

$$S_i: GF(2)^n \rightarrow GF(2); x \mapsto S_i(x) \quad (8)$$

Let $\deg_x S_i$ denote the degree of the Boolean function $S_i$ ($0 \leq i \leq m-1$) regarding the variable set X. Let the minimum value of $\deg_x S_i$ ($0 \leq i \leq m-1$) be represented by $\deg_x S$, which is the criterion for higher order differential attack.

$$\deg_x S = \min(\deg_x S_i) \quad (9)$$

where min is conditioned by $0 \leq i \leq m-1$.

A necessary condition that the S-box needs to satisfy to provide security against higher order differential attack is that $\deg_x S$ has a large value. It is known that when S is bijective (i.e. the input/output relationship can be determined uniquely in both directions), the maximum value of $\deg_x S$ is n−1.

(d) Necessary Condition for Resistance to Interpolation Attack

A description will be given below of the definition of a criterion for interpolation attack as a measure of the resistance thereto of the S-box, a method for measuring the criterion and a necessary condition for the resistance to interpolation attack.

The principle of interpolation attack is as follows: With a key k fixed, a ciphertext y can be expressed, for example, by the following equation using a polynomial $f_k(x)$ over $GF(q)$ regarding a plaintext x.

$$y = f_k(x) = c_{q-1}x^{q-1} + c_{q-2}x^{q-2} + \ldots + c_j x^j + \ldots + c_1 x^1 + c_0 x^0 \qquad (10)$$

where q is a prime or its power. When the number of terms of non-zero coefficients contained in the polynomial $f_k(x)$ with respect to x is c, the polynomial $f_k(x)$ can be constructed as by the Lagrange interpolation theorem if c different sets of plaintexts and the corresponding sets of ciphertexts $(x_i, y_i)$ (where $i=1, \ldots, c$) are given. By this, a ciphertext corresponding a desired plaintext x can be obtained.

The larger the number of terms contained in the polynomial $f_k(x)$, the larger the number of sets of plaintexts and ciphertexts necessary for interpolation attack using the polynomial representation $f_k(x)$ over $GF(q)$, and the attack becomes difficult accordingly or becomes impossible.

When the number of terms contained in the polynomial representation over $GF(q)$ of the S-box is small, there is a possibility that the number of terms contained in the polynomial of the whole cipher over $GF(q)$ decreases. Of course, even if the number of terms contained in the polynomial over $GF(q)$ of the S-box is large, care should be taken in the construction of the whole cipher to avoid terms cancelling out each other, resulting in a decrease in the number of terms contained in the polynomial over $GF(q)$ of the whole cipher; however, this concerns encryption technology, and as the criterion of the S-box for interpolation attack, it is a necessary condition for the resistance to interpolation attack that the number of terms contained in the polynomial representation over $GF(q)$ is large. Let the number of terms contained in the polynomial representation over $GF(q)$ of the function S of the S-box be represented by $coeff_q S$, which is used as the criterion for interpolation attack using the polynomial representation over $GF(q)$.

Since the interpolation attack exists by the number of possible qs, it is desirable to calculate the number of terms $coeff_q S$ in as many polynomials over $GF(q)$ as possible and make sure that they do not take small values.

(e) Necessary Condition for Resistance to Partitioning Cryptanalysis

A description will be given below of the definition of a criterion for partitioning cryptanalysis as a measure of the resistance thereto of the S-box, a method for measuring the criterion and a necessary condition for providing the resistance to partitioning cryptanalysis. In partitioning cryptanalysis, an observation is made of some measure which holds for a certain subset of the whole plaintext set and a certain subset of the whole ciphertext set, and if a large imbalance is found in the measure, then it can be used to cryptanalyze the whole cipher. As "some measure I" there are mentioned a peak imbalance and a squared Euclidean imbalance in literature "C. Harpes, J. L. Massey, 'Partitioning Cryptanalysis,' Fast Software Encryption Workshop (FSE4) (Lecture Notes in Computer Science 1267), pp. 13–27, Springer-Verlag, 1997."

In literature "Takeshi Hamada, Takafumi Yokoyama, Tohru Shimada, Toshinobu Kaneko, 'On partitioning cryptanalysis of DES,' Proc. in 1998 Symposium on Cryptography and Information Security (SCIS'98-2.2.A)," it is reported that an attack on the whole cipher succeeded through utilization of imbalance observed in input and output sets of the S-box of the DES cipher—this indicates that the criterion for partitioning cryptanalysis similarly defined for the input and output sets of the S-box is a necessary condition for the whole cipher to be secure against partitioning cryptanalysis.

Let u divided subsets of the whole set of S-box inputs be represented by $F_0, F_1, \ldots, F_{u-1}$ and v divided subsets of the whole set of S-box outputs by $G_0, G_1, \ldots, G_{v-1}$. Suppose that all the subsets contain an equal number of elements. A function f for mapping the input x on the subscript $\{0, 1, \ldots, u-1\}$ of each subset will hereinafter be referred to as an input partitioning function and a function g for mapping the output y on the subscript $\{0, 1, \ldots, v-1\}$ of each subset as an output partitioning function. That is, the function f indicates the input subset to which the input x belongs, and the function g indicates the output subset to which the output y belongs. Let partitions F and G be defined by $$F = \{F_0, F_1, \ldots, F_{u-1}\},$$

$$G = \{G_0, G_1, \ldots, G_{v-1}\}.$$

Then, an imbalance $I_s(F, G)$ of an S-box partition pair $(F, G)$ is given by the following equation (11).

$$I_S(F, G) = \frac{1}{u}\sum_{i=0}^{u-1} I(g(S(x)) \mid F(x) = i) \qquad (11)$$

Expressing $I(g(S(x))|F(x)=i)$ on the right-hand side of Eq. (11) by $I(V)$, this is the afore-mentioned "Measure I." According to the afore-mentioned literature by C. Harpes et al., in the case of using the peak imbalance as this measure, it is expressed as follows:

$$I_P(V) = \frac{v}{v-1}\left(\max_{0 \le j < v} P[V = j] - \frac{1}{v}\right) \qquad (12)$$

In the case of using the squared Euclidean imbalance as this measure, it is expressed as follows:

$$I_E(V) = \frac{v}{v-1}\sum_{j=0}^{v-1}\left(P[V = j] - \frac{1}{v}\right)^2 \qquad (13)$$

$P[V=j]$ represents the probability that the whole output y corresponding to the whole input x of an i-th ($i=0, \ldots, u-1$) input group $F_i$ assigned to an output group $G_j$ ($j=0, \ldots, v-1$), and the sum total of probabilities of the assignment to respective output groups is 1. For example, if $k_j$ outputs of the whole output y ($k_i$ outputs) corresponding to the whole input x (assumed to consist of $k_i$ inputs) are assigned to the group $G_j$, then the probability of assignment to the group $G_j$ is $k_j/k_i$. The peak imbalance $I_P(V)$ of Eq. (12) represents a value obtained by normalizing imbalance of the maximum assignment probability relative to an average probability, and the Euclidean imbalance $I_E(V)$ of Eq. (13) represents a value obtained by normalizing a square-sum of imbalance of the assignment probability from the average one. This measure $I_P$ or $I_E$ is applied to Eq. (11) to calculate the imbalance $I_S(F, G)$ for each partition-pair (F, G). The partition-pair varies, for instance, with the way of selecting the partitioning functions f and g. For example, the division numbers u and v are also parameters that are specified by the functions f and g.

The measure given by Eq. (11) is the criterion for the partitioning attack on the S-box and takes a value greater than 0 and smaller than 1; it is a necessary condition for the resistance to the partitioning attack that the difference between the above value and its one-half is small. Accordingly, the S-box function is chosen which minimizes the value $|I_S(F, G) - 1/2|$.

(f) Necessary Condition for Resistance to Differential-Linear Cryptanalysis

A description will be given below of the definition of a criterion for differential-linear cryptanalysis as a measure of the resistance thereto of the S-box, a method for measuring the criterion and a necessary condition for providing the resistance to differential-linear cryptanalysis.

In differential-linear cryptanalysis, an observation is made of, for example, the exclusive OR of S-box input and output difference values, and if a large imbalance is found, then it can be used to cryptanalyze the whole cipher.

Letting the S-box input, input difference value and output mask value be represented by x, $\Delta x$ and $\Gamma y$, respectively, $\xi_S(\Delta x, \Gamma y)$ defined by the following equation can be calculated.

$$\xi_S(\Delta x, \Gamma y) = |2 \# \{x \in GF(2)^n | [S(x) + S(x + \Delta x)] \cdot \Gamma y = 1\} - 2^n| \quad (14)$$

where the operations "+" and "·" are the same as those used in the criterion for differential cryptanalysis and the criterion for linear cryptanalysis, respectively. The maximum value $\Xi_S$ given by the following equation for any one of all combinations of $\Delta x$ and $\epsilon y$ in the measure $\xi_S(\Delta x, \Gamma y)$ thus calculated is used as the criterion for differential-linear cryptanalysis.

$$\Xi_S = \max_{\Delta x \neq 0, \Gamma y \neq 0} \xi_S(\Delta x, \Gamma y) \quad (15)$$

Since a large value of the criterion $\Xi_S$ may be a weakness in differential-linear cryptanalysis, it is a necessary condition for the resistance thereto that this value is small (no marked imbalance).

Incidentally, such functions S as expressed by the following equations are used in some ciphers.

$$S: GF(2)^n \to GF(2)^n : x \to x^{2k} \text{ in } GF(2^n) \quad (16a)$$

$$S: GF(2)^n \to GF(2)^n : x \to x^{2k+1} \text{ in } GF(2^n) \quad (16a)$$

Letting k denote a natural number equal to or greater than n, the differential-linear attack criteria of these functions S take 2n (the maximum theoretical value). No report has been made of an example in which this property leads to a concrete cipher attack, but it is desirable that the criteria take as small a value as possible.

Next, a description will be given of an embodiment according to a second aspect of the present invention.

The resistance of the S-box to various attacks is evaluated as described above, but the generation of a highly resistant random function gives rise to an issue of how to select a group of candidate functions. The reason for this is that much complexity is needed to select functions satisfying the above-mentioned condition from an enormous number of functions.

By the way, from an example cited in literature "T. Jakobsen, L. R. Knudsen, 'The Interpolation Attack on Block Cipher,' Fast Software Encryption Workshop (FSE4) (Lecture Notes in Computer Science 1267), pp. 28–40, Springer-Verlag, 1997," it is known that the block cipher is readily cryptanalyzed by the higher order and the interpolation cryptanalysis in the case where the S-box is formed by a function of a certain algebraic structure selected as a function resistant to the differential and the linear cryptanalysis and the whole cipher is constructed in combination with only by an operation which does not destroy the algebraic structure. On the other hand, the inventors of this application have found that a composite function, which is a combination of a function resistant to the differential and the linear cryptanalysis with a function of a different algebraic structure (basic operation structure), is also resistant to other attacks in many cases.

According to the second aspect of the present invention, functions resistant to the differential and the linear cryptanalysis and functions which have algebraic structures different from those of the first-mentioned functions are combined (composition of functions, for instance) and such composite functions are selected as groups of candidate functions; the resistance to each cryptanalysis is evaluated for each function group and functions of high resistance are chosen.

Incidentally, the way of selecting the candidate function groups in the present invention is not limited specifically to the above.

According to the second aspect of the present invention, a function (for example, a composite function), which is a combination of at least one function resistant to the differential and the linear cryptanalysis with at least one function of a different algebraic structure is selected as a candidate function group. With this scheme, it is possible to efficiently narrow down from a small number of candidates those functions which are resistant not only to the differential and the linear cryptanalysis but also to attacks which utilize the algebraic structures of the functions used, such as the higher order differential and the interpolation attack.

In the following embodiment according to the second aspect of the present invention, a description will be given of how to design an 8-bit I/O S-box.

Figure 2:
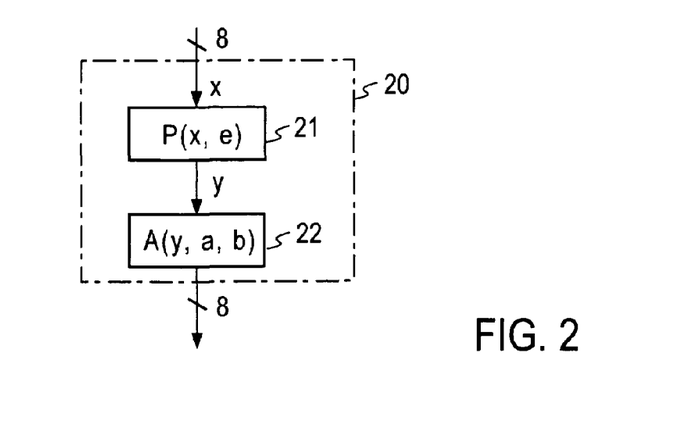
FIG. 2 is a block diagram depicting an example of the basic configuration of the random function generating apparatus according to the present invention.

Now, consider that a P-function part 21 for generating a function P(x, e) and an A-function part 22 for generating a function A(y, a, b) of an algebraic structure different from the function P(x, e) are combined as a candidate function for forming an S-box 20 as shown in FIG. 2.

$$S: GF(2)^8 \to GF(2)^8 ; x \mapsto A((P(x,e)),a,b)$$

where $$P(x,e) = x^e \text{ in } GF(2^8) \quad (17)$$

$$A(y,a,b) = ay + b \pmod{2^8} \quad (18)$$

The function P(x, e) defined by Eq. (17) is a power function to be defined over Galois Field $GF(2^8)$; this function is resistant to differential cryptanalysis and linear cryptanalysis when the parameter e is selected suitably, but it has no resistance to higher order differential, linear-differential, interpolation and partitioning attacks. On the other hand, the function A(y, a, b) defined by Eq. (18) is constructed by a simple addition and a simple multiplication, and this function has no resistance to any of the attacks.

Here, the parameters a, b and e can freely be set to any natural numbers in the range of from 0 to 255 (i.e. $2^8-1$). Of them, the parameters a and b need to have a Hamming weight greater than 3 but smaller than 5, that is, these parameters a and b are each 8-bit and required to have three to five "1" (or "0") bits, and the S-box needs to be bijective; the parameters a, b and c are narrowed down by evaluating whether they satisfy such necessary conditions for providing security against differential cryptanalysis, linear cryptanalysis, interpolation attack and partitioning attack.

Figure 3:
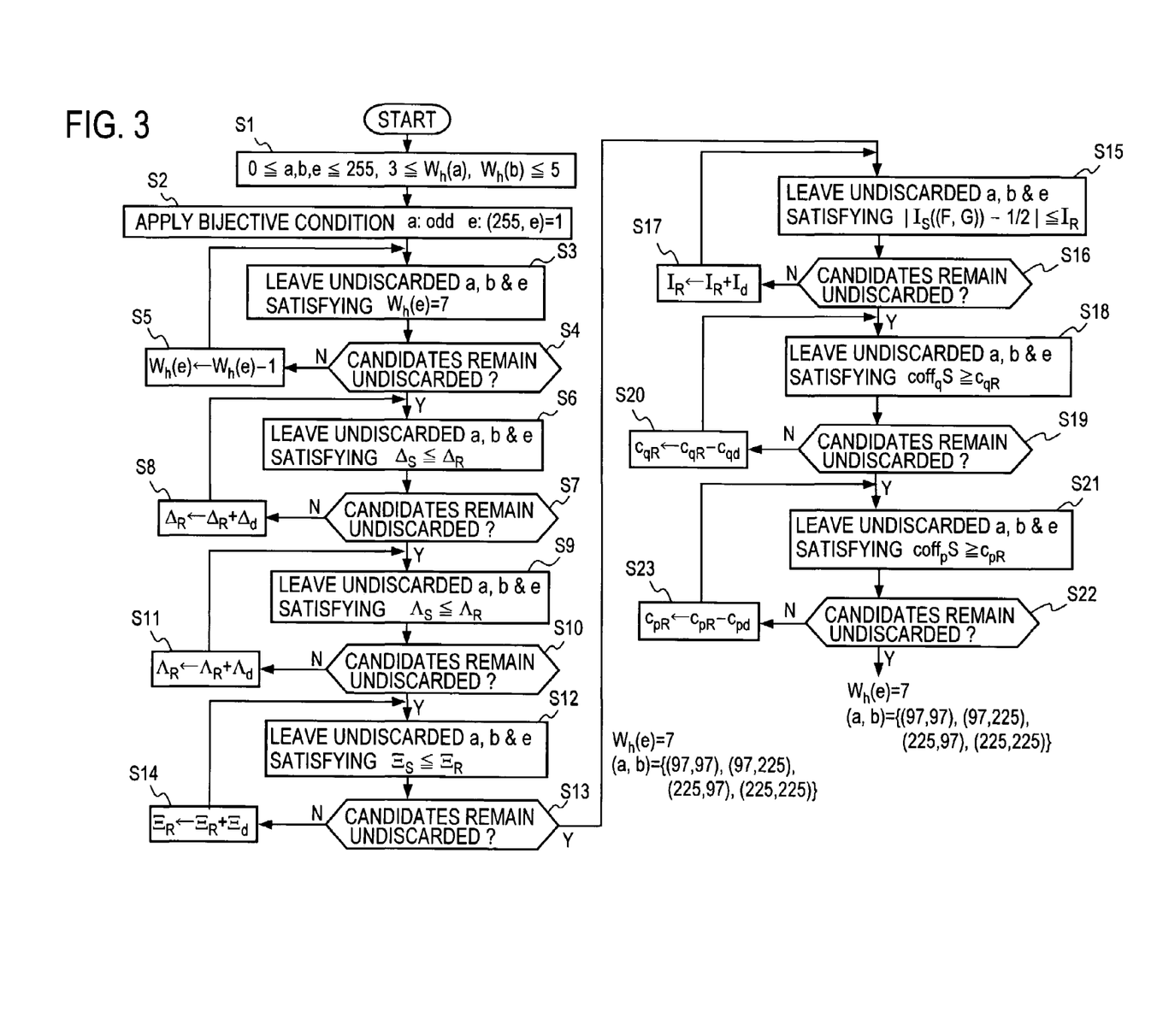
FIG. 3 is a flowchart showing an example of a procedure of an embodiment of the random function generating apparatus according to the present invention.

In FIG. 3 there is depicted the procedure of an embodiment of the apparatus according to the present invention. Incidentally, the invention is not limited specifically to this embodiment. There is flexibility in the way of selecting functions as candidates for the S-box. Further, the number of design criteria for the S-box is also large, and their priority and the order of narrowing down the candidates are also highly flexible.

Step S1: In the input part 11, predetermine the range of each of the parameters a, b and e in Eqs. (17) and (18) to be greater than 0 but smaller than $2^8-1$, and limit the Hamming weights $W_h(a)$ and $W_h(b)$ of the parameters a and b to the range of from 3 to 5.

Step S2: Evaluate whether candidate functions S are bijective or not. When the parameter a is an odd number and the parameter e is prime relative to $2^8-1$ (which parameter is expressed by (e,255)=1), the functions S are bijective; select those of the parameters which satisfy these conditions, and discard candidates which do not satisfy them. This processing is performed in the criteria evaluating part 14g in FIG. 1. Alternatively, the parameter a is obtained by inputting only an odd number in the input part 11.

Step S3: It is known that the Hamming weight $W_h(e)$ of the parameter e (which weight indicates the number of "1s" in e in the binary representation; for example, if e=11101011, $W_h(e)=6$) and the degree $\deg_x P$ of the function P in the Boolean function representation are equal to each other. In order to satisfy the condition for a criterion $\deg_x S$ of the remaining candidate functions S for higher order differential attack, select those of the remaining candidate functions S whose parameters e having a Hamming weights Wh(e) of 7 that is the theoretically maximum value of e, that is, select e=127, 191, 223, 239, 251, 253 and 254. Discard the candidates that do not meet the condition.

Step S4: Determine if any candidates still remain undiscarded.

Step S5: When it is determined in the preceding step that no candidate has survived, ease the condition $W_h(e) \leftarrow W_h(e)-1$ and then go back to step S3.

Step S6: From the candidate functions remaining after the process of Step S3, select those candidates for which the criterion $\Delta_S$ for differential attack defined by Eq. (3) is smaller than a predetermined reference value $\Delta_R$. Discard the candidates that do not meet this condition.

Step S7: Determine if any candidates still remain undiscarded after Step S6.

Step S8: If no candidate remains, add a predetermined step width $\Delta_d$ to the reference value $\Delta_R$ (ease the condition) to update it, and return to step S6 to repeat the processing.

Step S9: From the candidate functions S remaining after Step S6, select those candidates for which the criterion $\Lambda_S$ for linear attack defined by Eq. (5) is smaller than a predetermined reference value $\Lambda_R$. Discard the candidates that do not meet this condition.

Step S10: Determine if any candidates still remain undiscarded after Step S9.

Step S11: If no candidate remains, add a predetermined step width $\Lambda_d$ to the reference value $\Lambda_R$ (ease the condition) to update it, and return to step S9 to repeat the processing.

Step S12: From the candidate functions S remaining after step S9, select those candidates for which the criterion $\Xi_S$ for differential-linear attack defined by Eq. (15) is smaller than a predetermined reference value $\Xi_R$. Discard the candidates that do not meet this condition.

Step S13: Determine if any candidates still remain undiscarded after Step S12.

Step S14: If no candidate remains, add a predetermined step width $\Xi_d$ to the reference value $\Xi_R$ (ease the condition) to update it, and return to step S12 to repeat the processing.

As a result, the parameters are narrowed down to those given below.

(a,b)=(97,97),(97,225),(225,97),(225,225)

e=127,191,223,239,247,251,253,254

Step S15: For the candidate functions S by all combinations of the parameters remaining after Step S12, calculate the criterion $I_S(F, G)$ for partitioning attack and select those candidates for which |IS(F, G)−1/2| is smaller than a reference value R. Discard the candidates that do not meet this condition.

Step S16: Determine if any candidates still remain undiscarded after Step S15.

Step S17: If no candidate remains, add a predetermined step width $I_d$ to the reference value $I_R$ (ease the condition) to update it, and return to step S15 to repeat the processing.

Step S18: For the candidate functions S by all combinations of the parameters remaining after Step S15, select those candidates for which the criterion $\text{coeff}_q S$ (where q=28) for interpolation attack, which utilizes the polynomial over $GF(2^8)$, is larger than a reference value $c_{qR}$, and discard the other candidates.

Step S19: Determine if any candidates still remain undiscarded after Step S18.

Step S20: If no candidate remains, subtract a predetermined step width $c_{qd}$ from the reference value $c_{qR}$ (ease the condition) to update it, and return to step S19 to repeat the processing.

Step S21: From all primes p in the range of from $2^{8+1}$ to $2^9$, select those of the candidate functions S for which the criterion $\text{coeff}_p S$ for interpolation attack is larger than the reference value $c_{pR}$, and discard the other candidates.

Step S22: Determine if any candidates still remain undiscarded after Step S21.

Step S23: If no candidate remains, subtract a predetermined step width $c_{pd}$ from the reference value $c_{pR}$ (ease the condition) to update it, and return to step S21 to repeat the processing.

As the result of the evaluation described above, the following combinations (a total of 32 combinations) of parameters are left undiscarded.

(a,b)=(97,97),(97,225),(225,97),(225,225)

(e)=127,191,223,239,247,251,253,254

This is identical with the results obtained in step S12. This means that functions secure against every attack taken into account in this embodiment are already obtained in step S12.

Since the 32 functions thus selected are equally strong on the above-mentioned criteria, any of the functions can be used as the S-box.

In the evaluation of the S-box or in the function generation, the reference values $\Delta_R$, $\Lambda_R$, $\Xi_R$, $C_{qR}$ and $c_{pR}$ of the criteria for evaluation are each determined according to the required degree of randomness, that is, the required security against the respective cryptanalysis.

In the flowchart of FIG. 3, the order of selection of function candidates having the required resistance to the respective attacks (cryptanalyses) is not limited specifically to the order depicted in FIG. 3 but may also be changed.

With the random function generating method according to the present invention, it is unnecessary to select function candidates that have the required resistance to every attack shown in FIG. 3; and it also falls inside the scope of the present invention to select function candidates for at least one of higher order differential, differential-linear, partitioning and interpolation attacks. Instead of narrowing down the function candidates one after another for a plurality of cryptanalysis methods, it is also possible to evaluate the resistance of every function candidates to the respective cryptanalyses and select functions that have the reference resistance to them.

While in the above the random function generating method has been described to determine parameters of composite functions each composed of two functions, it need scarcely be said that the method is similarly applicable to parameters of functions each composed of three or more functions and to the determination of parameters of one function.

The function randomness evaluating method and the random function generating method of the present invention, described above in the first and second embodiments, may also be prerecorded on a recording medium as programs for execution by a computer so that the programs are read out and executed by the computer to evaluate the randomness of functions and generate random functions.

EFFECT OF THE INVENTION

As described above, according to the present invention, in the method and apparatus for evaluating the randomness of S-box functions that serve as components of an cryptographic device or the like, there is provided, in addition to the conventional evaluating method, means for evaluating whether the functions is resistant to differential, linear, higher order differential, interpolation, partitioning and differential-linear attacks and other possible attacks, whereby it is possible to evaluate the randomness of the functions and design ciphers highly secure against the above cryptanalyses.

Furthermore, since functions each formed by a combination of a function resistant to differential cryptanalysis and linear cryptanalysis and a function of an algebraic structure different from that of the first-mentioned function are selected as candidate functions, functions resistant not only to the differential and linear cryptanalyses but also to attacks utilizing the algebraic structure, such as high order differential and interpolation attacks can be narrowed down from a small number of candidates.

Moreover, such a procedure as depicted in FIG. 3 allows efficient narrowing down of functions with a small amount of computational complexity.

Besides, by selecting candidate functions from combinations of functions of well-known different algebraic structures instead of selecting the candidates at random, it is also easy to show that the S-box has no trap-door (a secret trick that enables only a designer to cryptanalyze the cipher concerned).

The random function thus evaluated and generated by the present invention is used as the S-box formed as by a ROM to generate an irregular outputs from the input to a cryptographic device which conceals data fast and securely.

What is claimed is:

1. A random function generating apparatus for a data encryption device comprising:

input means for inputting digital signals representing parameter values of each of a plurality of functions each of a composite function composed of first and second functions of different algebraic structures, and for storing them in storage means;

candidate function generating means for generating candidate functions each of said composite function formed of said first and second functions of different algebraic structures based on said plurality of parameters read out of the storage means;

resistance evaluating means for evaluating the resistance of each of said candidate functions to a cryptanalysis; and selecting means for selecting those of said resistance-evaluated candidate functions which are highly resistant to said cryptanalysis and outputting digital signals representing selected ones of said resistance-evaluated candidate functions;

wherein one of said first and second functions of different algebraic structures is resistant to each of differential cryptanalysis and linear cryptanalysis, wherein said input means is adapted to input digital signals representing input difference values $\Delta x$ and output mask values $\Gamma y$ and storing them in the storage means, and said resistance evaluating means comprises at least one of:

higher-order-differential cryptanalysis resistance evaluating means for: calculating a minimum value of the degree of a Boolean polynomial for input bits by which output bits of each of said candidate functions are expressed; and evaluating the resistance of said each candidate function to higher order cryptanalysis based on the result of said calculation;

interpolation-cryptanalysis resistance evaluating means for: expressing an output value y as $y=f_k(x)$ for an input value x and a fixed key k using a polynomial over Galois field which is composed of elements equal to a prime p or a power of said prime p; counting a number of terms of said polynomial; and evaluating the resistance of said each candidate function to interpolation cryptanalysis based on the result of said number;

partitioning-cryptanalysis resistance evaluating means for: dividing all input values of the function to be evaluated and the corresponding output values into input subsets and output subsets; calculating an imbalance of the relationships between the input subset and the output subset with respect to their average corresponding relationship; and evaluating the resistance of said candidate function to partitioning cryptanalysis based on the result of said calculation; and differential-linear cryptanalysis resistance evaluating means for: calculating, for every set of input difference value $\Delta x$ and output mask value $\Gamma y$ of the function $S(x)$ to be evaluated a number of input values x for which the inner product of $(S(x)+S(x+\Delta x))$ and said output mask value $\Gamma y$ is 1; and evaluating the resistance of said candidate function to differential-linear cryptanalysis based on the result of said calculation.

2. A random function generating method for data encryption comprising the steps of:
   (o) inputting digital signals representing input difference values $\Delta x$, output mask values $\Gamma y$ and parameter values of each of a plurality of candidate functions and storing them in storage means;
   (a) setting various input values read out of the storage means for each of candidate functions $S(x)$ of S-box and calculating output values corresponding to said various input values x;
   (b) storing the output values in storage means; and
   (c) evaluating the resistance of each of said candidate functions to a cryptanalysis based on the output values stored in said storage means, and selectively outputting candidate function highly resistant to said cryptanalysis; and
   wherein said step (c) comprising:
   (c-1) a higher-order cryptanalysis resistance evaluating step of: calculating a minimum value of the degree of a Boolean polynomial for input bits of each of said candidate functions by which its output bits are expressed; evaluating the resistance of said each candidate function to higher order cryptanalysis based on the result of said calculation; and leaving those of said candidate functions whose resistance is higher than a predetermined first reference and discarding the others;
   (c-2) a differential-linear cryptanalysis resistance evaluating step of: calculating, for every set of input difference value $\Delta x$ and output mask value $\Gamma y$ of each candidate function $S(x)$, a number of input values x for which the inner product of $(S(x)+S(x+\Delta x))$ and said output mask value $\Gamma y$ is 1; evaluating resistance of said candidate function to differential-linear cryptanalysis based on the result of said calculation; and leaving those of said candidate functions whose resistance is higher than a predetermined second reference and discarding the others;
   (c-3) a partitioning-cryptanalysis resistance evaluating step of: dividing all input values of each candidate function and the corresponding output values into input subsets and output subsets; calculating an imbalance of the relationship between the input subset and the output subset with respect to their average corresponding relationship; evaluating the resistance of said each candidate function to said partitioning cryptanalysis based on the result of said calculation; and leaving those of said candidate functions whose resistance is higher than a predetermined third reference and discarding the others; and
   (c-4) an interpolation-cryptanalysis resistance evaluating step of: expressing an output value y as $y=f_k(x)$ for an input value x and a fixed key k using a polynomial over Galois field which is composed of elements equal to a prime p or a power of said prime p; counting a number of terms of said polynomial; evaluating the resistance of said candidate function to interpolation cryptanalysis; and leaving those of said candidate functions whose resistance is higher than a predetermined fourth reference and discarding the others;
   wherein said candidate functions are each a composite function composed of first and second functions of different algebraic structures, at least one of said first and second functions being resistant to said differential cryptanalysis and said linear cryptanalysis.

3. The random function generating method of claim 2, wherein:
   said differential-linear-cryptanalysis resistance evaluating step (c-2) includes a step of: calculating the following equation for every set of said input difference value $\Delta x$ except 0 and said output mask value $\Gamma y$ except 0

$\xi_S(\Delta x, \Gamma y) = |2 \times \#\{x \in GF(2)^n | (S(x)+S(x+\Delta x)) \cdot \Gamma y = 1\} - 2^n|;$ calculating a maximum value $\Xi$ among the calculation results; and evaluating the resistance of said candidate function to said differential-linear cryptanalysis based on said maximum value $\Xi$; and
   said partitioning cryptanalysis resistance evaluating step (3) includes a step of dividing an input value set F and an output value set G of said candidate function into u input subsets $\{F_0, F_1, \ldots, F_{u-1}\}$ and v output subsets $\{G_0, G_1, \ldots, G_{v-1}\}$; for each partition-pair $(F_i, G_i)$ (i=0, \ldots, u-1; j=0, 1, \ldots, v-1), calculating a maximum one of probabilities that all output values y corresponding to all input values x of the input subset $F_1$ belong to the respective output subsets $G_j$ (j= 0, \ldots, v-1); calculating a measure $I_S(F, G)$ of an average imbalance of a partition-pair (F, G) based on all maximum values calculated for all partition pairs; and evaluating the resistance of said candidate function to said partitioning cryptanalysis based on said measure.

4. The random function generating method of claim 3, wherein said candidate functions are each a composite function composed of at least one function resistant to said differential cryptanalysis and said linear cryptanalysis and at least one function of an algebraic structure different from that of said at least one function.

5. The random function generating method of claim 2 or 3, wherein:
   said step (c-1) includes a step of: when no candidate function remains undiscarded, easing the candidate function selecting condition by changing said first reference by a first predetermined width, and executing again the evaluation and selecting process;
   said step (c-2) includes a step of: when no candidate function remains undiscarded, easing the candidate function selecting condition by changing said second reference by a second predetermined width, and executing again the evaluation and selecting process;
   said step (c-3) includes a step of: when no candidate function remains undiscarded, easing the candidate function selecting condition by changing said third reference by a third predetermined width, and executing again the evaluation and selecting process; and
   said step (c-4) includes a step of: when no candidate function remains undiscarded, easing the candidate function selecting condition by changing said fourth reference by a fourth predetermined width, and executing again the evaluation and selecting process.

6. The random function generating method of claim 5, wherein said candidate functions are each a composite function composed of at least one function resistant to said differential cryptanalysis and said linear cryptanalysis and at least one function of an algebraic structure different from that of said at least one function.

7. The random function generating method of claim 2 or 3, further comprising:
   (c-5) a differential-cryptanalysis resistance evaluating step of: calculating, for each candidate function $S(x)$, the number of inputs x that satisfy $S(x)+S(x+\Delta x)=\Delta y$ for every set (Δx, Δy) except Δx=0; evaluating the resistance of said each candidate function to differential cryptanalysis based on the result of said calculation; and leaving those of said candidate functions whose resistance is higher than a predetermined fifth reference and discarding the others before said step (c-2); and (c-6) a linear-cryptanalysis resistance evaluating step of: calculating, for each candidate function, the number of input values x for which the inner product of the input value x and its mask value Γx is equal to the inner product of a function output value S(x) and its mask value Γy; evaluating the resistance of said each candidate function to linear cryptanalysis based on the result of said calculation; and leaving those of said candidate functions whose resistance is higher than a predetermined sixth reference and discarding the others after said step (c-5).

8. The random function generating method of claim 7, wherein:

said step (c-5) includes a step of: when no candidate function remains undiscarded, easing the candidate function selecting condition by changing said fifth reference by a fifth predetermined width, and executing again the evaluation and selecting process; and said step (c-6) includes a step of: when no candidate function remains undiscarded, easing the candidate function selecting condition by changing said sixth reference by a sixth predetermined width, and executing again the evaluation and selecting process.

9. A recording medium having recorded thereon a random function generating method for data encryption as a computer program, said program comprising the steps of:

(a) setting various values as each parameter for candidate functions S(x) and calculating output values corresponding to various input values;

(b) storing the output values in storage means; and (c) evaluating resistance of each of said candidate functions to a cryptanalysis based on the output values stored in said storage means, and selectively outputting candidate function highly resistant to said cryptanalysis; and wherein said step (c) comprises:

(c-1) a higher-order cryptanalysis resistance evaluating step of calculating a minimum value of the degree of a Boolean polynomial for input bits of each of said candidate functions by which its output bits are expressed, evaluating the resistance of said each candidate function to higher order cryptanalysis based on the result of said calculation; and leaving those of said candidate functions whose resistance is higher than a predetermined first reference and discarding the others;

(c-2) a differential-linear cryptanalysis resistance evaluating step of: calculating, for every set of input difference value Δx and output mask value Γy of each candidate function S(x), a number of input values x for which the inner product of (S(x)+S(x+Δx)) and said output mask value Γy is 1; evaluating resistance of said candidate function to differential-linear cryptanalysis based on the result of said calculation; and leaving those of said candidate functions whose resistance is higher than a predetermined second reference and discarding the others;

(c-3) a partitioning-cryptanalysis resistance evaluating step of: dividing all input values of each candidate function and the corresponding output values into input subsets and output subsets; calculating an imbalance of the relationship between the input subset and the output subset with respect to their average corresponding relationship; evaluating the resistance of said each candidate function to said partitioning cryptanalysis based on the result of said calculation; and leaving those of said candidate functions whose resistance is higher than a predetermined third reference and discarding the others; and (c-4) an interpolation-cryptanalysis resistance evaluating step of: expressing an output value y as $y=f_k(x)$ for an input value x and a fixed key k using a polynomial over Galois field which is composed of elements equal to a prime p or a power of said prime p; counting a number of terms of said polynomial; evaluating the resistance of said candidate function to interpolation cryptanalysis; and leaving those of said candidate functions whose resistance is higher than a predetermined fourth reference and discarding the others;

wherein said candidate functions are each a composite function composed of first and second functions of different algebraic structures, at least one of said first and second function being resistant to said differential cryptanalysis and said linear cryptanalysis.

10. The recording medium of claim 9, wherein:

said differential-linear-cryptanalysis resistance evaluating step (c-2) includes a step of: calculating the following equation for every set of said input difference Δx except 0 and said output mask value Γy except 0

$$\xi_S(\Delta x, \Gamma y)=|2\times\#\{x \in GF(2)^n |(S(x)+S(x+\Delta x))\cdot \Gamma y=1\}-2^n|;$$

calculating a maximum value Ξ among the calculation results; and evaluating the resistance of said candidate function to said differential-linear cryptanalysis based on said maximum value Ξ; and said partitioning cryptanalysis resistance evaluating step (3) includes a step of dividing an input value set F and an output value set G of said candidate function into u input subsets $\{F_0, F_1, \ldots, F_{u-1}\}$ and v output subsets $\{G_0, G_1, \ldots, G_{v-1}\}$; for each partition-pair $(F_i, G_j)$ (i=0, ..., u−1; j=0, 1, ..., v−1), calculating a maximum one of probabilities that all output values y corresponding to all input values x of the input subset $F_i$ belong to the respective output subsets $G_j$ (j= 0, ..., v−1); calculating a measure $I_S(F, G)$ of an average imbalance of a partition-pair (F, G) based on all maximum values calculated for all partition pairs; and evaluating the resistance of said candidate function to said partitioning cryptanalysis based on said measure.

11. The recording medium of claim 10, wherein said candidate functions are each a composite function composed of at least one function resistant to said differential cryptanalysis and said linear cryptanalysis and at least one function of an algebraic structure different from that of said at least one function.

12. The recording medium of claim 9 or 10, wherein:

said step (c-1) includes a step of: when no candidate function remains undiscarded, easing the candidate function selecting condition by changing said first reference by a first predetermined width, and executing again the evaluation and selecting process;

said step (c-2) includes a step of: when no candidate function remains undiscarded, easing the candidate function selecting condition by changing said second reference by a second predetermined width, and executing again the evaluation and selecting process;

said step (c-3) includes a step of: when no candidate function remains undiscarded, easing the candidate function selecting condition by changing said third reference by a third predetermined width, and executing again the evaluation and selecting process; and said step (c-4) includes a step of: when no candidate function remains undiscarded, easing the candidate function selecting condition by changing said fourth reference by a fourth predetermined width, and executing again the evaluation and selecting process.

13. The recording medium of 12, wherein said candidate functions are each a composite function composed of at least one function resistant to said differential cryptanalysis and said linear cryptanalysis and at least one function of an algebraic structure different from that of said at least one function.

14. The recording medium of claim 9 or 10, wherein said program includes at least one of:

(c-5) a differential-cryptanalysis resistance evaluating step of: calculating, for each candidate function $S(x)$, the number of inputs x that satisfy $S(x)+S(x+\Delta x)=\Delta y$ for every set $(\Delta x, \Delta y)$ except $\Delta x=0$; evaluating the resistance of said each candidate function to differential cryptanalysis based on the result of said calculation; and leaving those of said candidate functions whose resistance is higher than a predetermined fifth reference and discarding the others before said step (c-2); and (c-6) a linear-cryptanalysis resistance evaluating step of: calculating, for each candidate function, the number of input values x for which the inner product of the input value x and its mask value $\Gamma x$ is equal to the inner product of a function output value $S(x)$ and its mask value $\Gamma y$; evaluating the resistance of said each candidate function to linear cryptanalysis based on the result of said calculation; and leaving those of said candidate functions whose resistance is higher than a predetermined sixth reference and discarding the others after step (c-5).

15. The recording medium of claim 14, wherein:

said step (c-5) includes a step of: when no candidate function remains undiscarded, easing the candidate function selecting condition by changing said fifth reference by a fifth predetermined width, and executing again the evaluation and selecting process; and said step (c-6) includes a step of: when no candidate function remains undiscarded, easing the candidate function selecting condition by changing said sixth reference by a sixth predetermined width, and executing again the evaluation and selecting process.

* * * * *

UNITED STATES PATENT AND TRADEMARK OFFICE
CERTIFICATE OF CORRECTION

| | |
|---|---|
| PATENT NO. | : 7,187,769 B1 |
| APPLICATION NO. | : 09/463907 |
| DATED | : March 6, 2007 |
| INVENTOR(S) | : Shiho Moriai et al. |

It is certified that error appears in the above-identified patent and that said Letters Patent is hereby corrected as shown below:

Correct block [73] of the Title Page to read:

[73]   Nippon Telegraph and Telephone Corporation (JP)

Signed and Sealed this

Fifth Day of June, 2007

JON W. DUDAS
*Director of the United States Patent and Trademark Office*